G. H. GIBSON.
DIFFERENTIAL PRESSURE BALANCING MECHANISM.
APPLICATION FILED AUG. 24, 1912.
1,191,415.
Patented July 18, 1916.
4 SHEETS—SHEET 3.
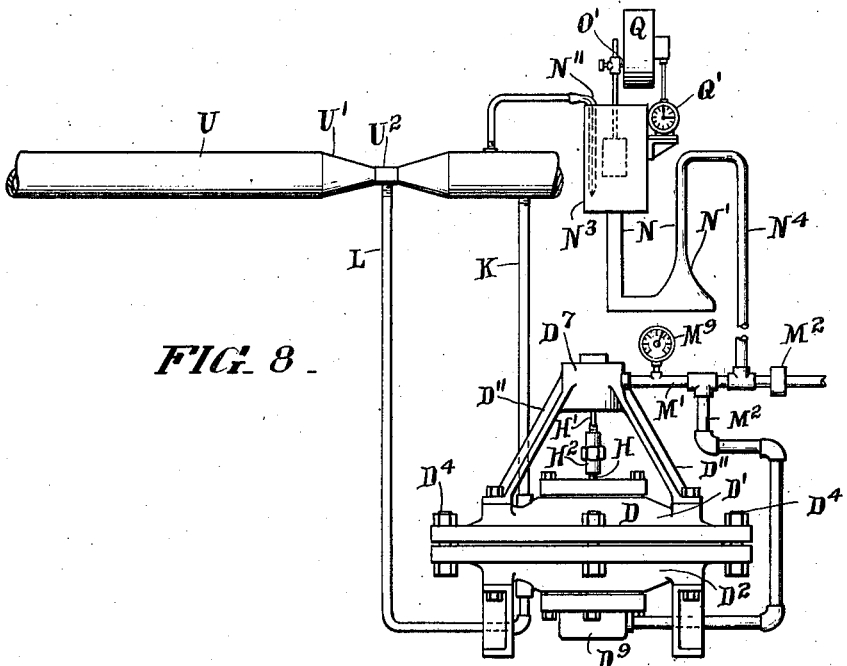
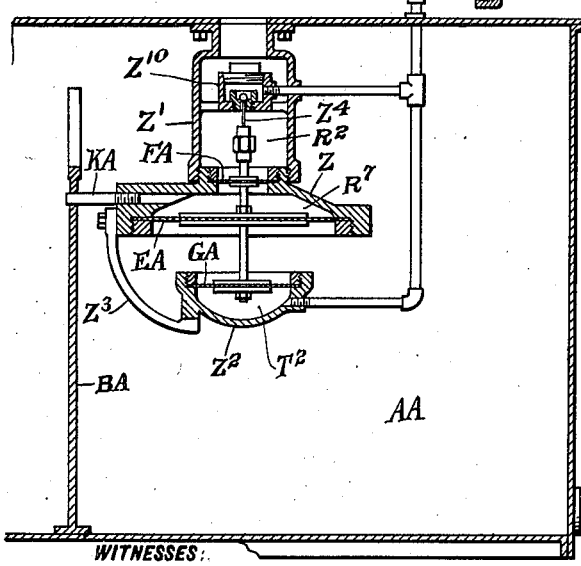
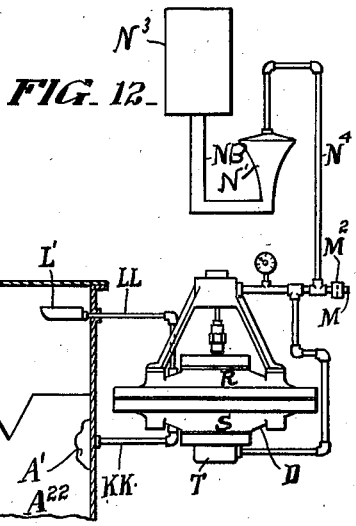
WITNESSES:
Daniel Webster, Jr.
S. Stewart
INVENTOR
George H. Gibson
BY
Francis Chambers
his ATTORNEY.

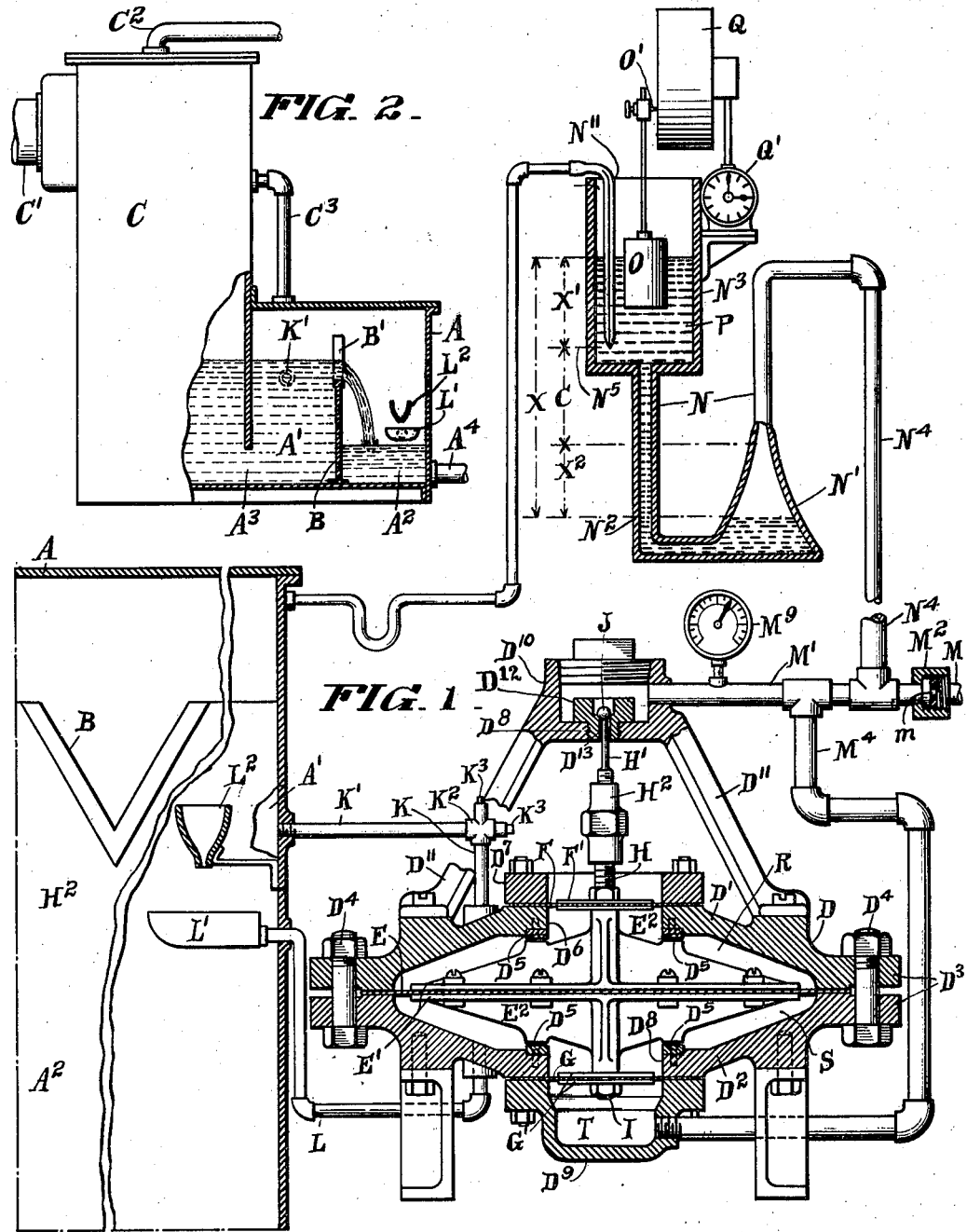

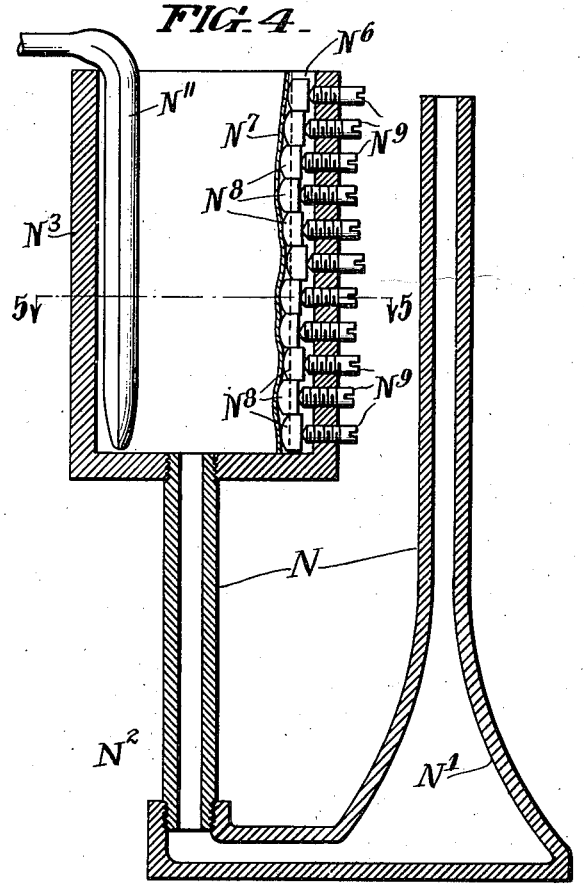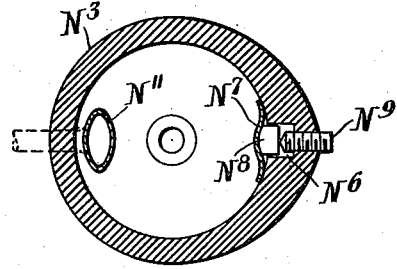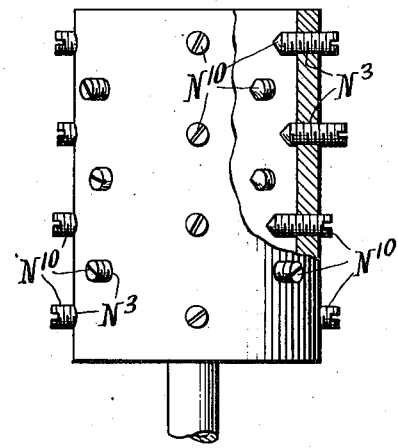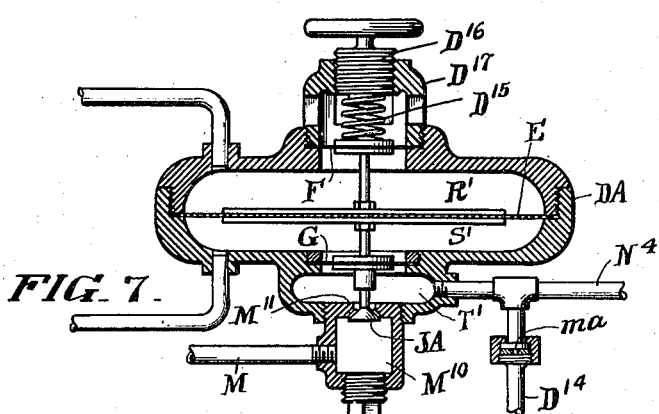

G. H. GIBSON.
DIFFERENTIAL PRESSURE BALANCING MECHANISM.
APPLICATION FILED AUG. 24, 1912.
1,191,415.
Patented July 18, 1916.
4 SHEETS—SHEET 4.
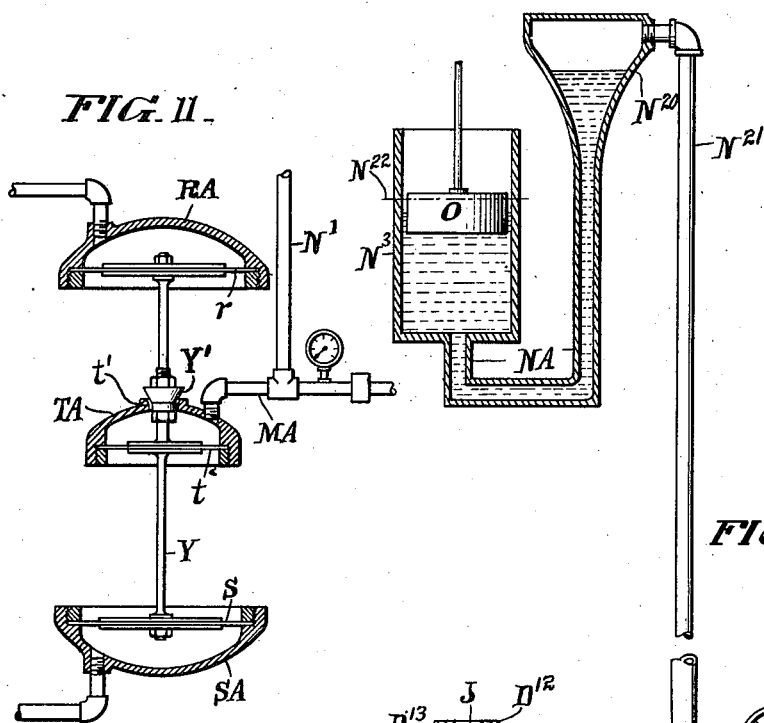
FIG. 11.
FIG. 10.
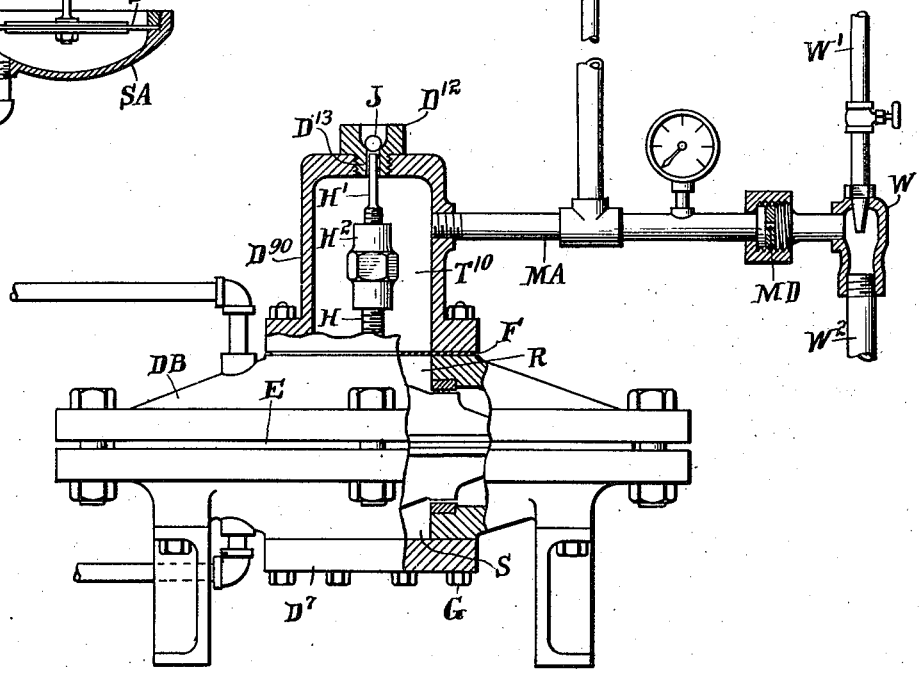
WITNESSES
INVENTOR
George H. Gibson
BY
ATTORNEY

UNITED STATES PATENT OFFICE.

GEORGE HERBERT GIBSON, OF MONTCLAIR, NEW JERSEY.

DIFFERENTIAL-PRESSURE-BALANCING MECHANISM.

1,191,415.  Specification of Letters Patent.  Patented July 18, 1916.

Application filed August 24, 1912. Serial No. 716,803.

*To all whom it may concern:*

Be it known that I, GEORGE H. GIBSON, a citizen of the United States of America, residing in Montclair, in the county of Essex and State of New Jersey, have invented a certain new and useful Improvement in Differential-Pressure-Balancing Mechanism, of which the following is a true and exact description, reference being had to the accompanying drawings, which form a part thereof.

A main object of my present invention is to provide simple and effective apparatus for measuring the differential of two fluid pressures. This I accomplish by the novel means which I have devised for balancing the differential action on a diaphragm or diaphragms of the two fluid pressures by the action on a connected diaphragm of a fluid under a pressure which is varied to produce the desired balancing action and which pressure is therefore a measure of the differential between the first mentioned two fluid pressures.

My different pressure balancing mechanism referred to is of especial utility in determining fluid rates of flow by measuring the difference between the fluid pressures at two points in the conduit or weir chamber through which the flow takes place. In particular the mechanism is well adapted for determining the flow of a liquid over a weir, located in a closed chamber in which the pressure in the vapor space thereof is variable. The rate of flow over such a weir is a function of the varying accumulation of liquid on the supply side of the weir. I determine the latter in accordance with the present invention by measuring the differential between the hydrostatic pressure of the liquid at a determined level on the supply side of the weir, and the pressure in the vapor space of the weir chamber, and my invention consists in part in the manner in which I have combined the weir chamber and the differential pressure balancing apparatus. When my differential pressure apparatus is used to determine fluid rates to flow in the manner referred to, the balancing pressure is, in general, a non-linear function of the rate of flow, and a further object of the invention is to provide simple and effective apparatus adapted to be actuated by the balancing pressure and to furnish readings proportional to the rate of flow to be determined.

The various features of novelty which characterize my invention are pointed out with particularity in the claims annexed to and forming a part of this specification.

For a better understanding of the invention however, and the advantages possessed by it, reference should be had to the accompanying drawings and descriptive matter in which I have illustrated and described forms in which my invention may be embodied.

Of the drawings, Figure 1 is an elevation partly in section of apparatus for measuring the flow of a liquid through a closed weir chamber. Fig. 2 is an elevation partly in section of a combined water heater and weir measuring apparatus. Fig. 3 is a sectional elevation of a portion of the apparatus shown in Fig. 1 taken on a larger scale than Fig. 1. Fig. 4 is a sectional elevation of a modified form of a portion of the indicating apparatus shown in Fig. 1. Fig. 5 is a section taken on the line 5—5 of Fig. 4. Fig. 6 is an elevation partly in section of a portion of a modified form of indicating apparatus. Fig. 7 is a sectional elevation of a modified form of differential pressure balancing mechanism. Fig. 8 is an elevation of apparatus for measuring the flow of fluid through a conduit, and Figs. 9, 10, 11 and 12 are elevations partly in section, each illustrating a different modification of portions of the apparatus shown in Fig. 1.

In the drawings and referring first to Figs. 1, 2 and 3, A represents a closed weir chamber divided into inlet and outlet compartments A' and A² respectively, by a weir B formed with one or more discharge notches B' at its upper edge. Such a weir chamber may be used for a variety of purposes and an important use of such apparatus is in connection with a water heater, as shown in Fig. 2, wherein C represents an open feed water heater of well known type from which the water passes to the inlet compartment A' of the weir chamber through the part A³. C' represents the steam supply pipe to the heater, and C² the cold water supply pipe. A⁴ represents the discharge pipe leading from the outlet compartment A² to a boiler feed pump or other hot water consuming or utilizing device. $C^3$ represents a pressure equalizing connection between the vapor spaces of the heater and the weir chamber. In so far as above described the apparatus disclosed involves no departure from the apparatus set forth and claimed in my prior Patent No. 1,015,556 granted Jan. 23, 1912. The apparatus disclosed herein does differ from that disclosed in my prior patent however, in the means employed for measuring the accumulation of water on the supply side of the weir.

As shown in Figs. 1, 2 and 3, the means employed for measuring the accumulation of water on the supply side of the weir comprises a chambered casing member D formed as shown of two cup shaped casing parts $D'$ and $D^2$ secured together by bolts $D^4$ passing through the flanges $D^3$. The member D is divided into two compartments or pressure chambers R and S by a flexible diaphragm E. This diaphragm is clamped at its margin between the flanges $D^3$ and has its central portion stiffened by the disks $E'$. The disks $E'$ as shown are formed with transverse webs $E^2$ which abut against stops $D^5$ carried by the casing parts $D'$ and $D^2$ to thereby limit the movements of the diaphragm E. The cup shaped part $D'$ is formed at its top with an aperture $D^6$ which is closed by a flexible diaphragm F. The diaphragm F is secured in place by the apertured clamping plate $D^7$ bolted to the casing part $D'$. The diaphragm F is stiffened at its center by the disks $F'$. The casing part $D^2$ is formed with an aperture $D^8$ closed by a flexible diaphragm G which is stiffened centrally by disks $G'$ and is secured in place by a clamping member $D^9$. The three diaphragms E, F and G are coaxial and are rigidly connected together by the axially disposed bolts H and I, passing through the diaphragms F and G respectively and tapped into central bosses formed on the adjacent disks $E'$. The diaphragm F and G are equal in area and substantially smaller than the diaphragm E. The diaphragm E, F and G may be made of rubber or other suitable material. The chamber A below the water level, and the chamber S are connected to the vapor space of the weir chamber. In the preferred form shown the connection between the weir chamber and chamber R comprises a horizontal pipe section $K'$ passing through the side wall of the weir chamber, a vertical section K connected at its lower end to the casing part $D'$, and a fitting $K^2$ provided with removable plugs $K^3$ through which the pipe sections $K'$ and K and particularly the former, may be cleaned from time to time. The connection between the compartment S and the vapor space of the weir chamber comprises a pipe section L extending between the casing part $D^2$ and the weir chamber and connected within the latter to a shallow cup shaped member $L'$ which is located in the weir chamber outlet compartment $A^2$ and has its upper edge at an appreciable distance below the weir notch apex level. I prefer to have the member $L'$ filled with water at all times and to insure this I may locate the member $L'$ so that a small quantity of the liquid flowing over the weir will pass into the member, or where the weir chamber is under steam pressure, the member $L'$ may be kept full and running over by condensation. For instance, as shown, a metallic body $L^2$ connected to the weir chamber wall may be arranged so that the water of condensation collecting on it will drip into the member $L'$.

With the apparatus described the chambers R and S, the piping K, $K'$ and L, and the member $L'$ will be filled with water at all times. The water in the chambers R and S and the external portions of the piping connected thereto will be maintained at approximately the external or room temperature, and will be practically unaffected in temperature by the temperature in the weir chamber. This has the advantage of minimizing errors in the indications of the apparatus due to changes in the temperature and consequently in the density of the water in the piping, and moreover, avoids subjecting the differential balancing pressure mechanism and particularly the different diaphragms to high temperatures or to sudden changes in temperature.

The downward pressure on the diaphragm E of the water in the chamber R will be partly balanced by the upward pressure of the water in the chamber S, but there will be a resultant downward fluid pressure action on the diaphragm E which will be proportional to the distance between the surface levels of the water in the member $L'$ and the water on the supply side of the weir. With the apparatus disclosed, this variable downward thrust on the diaphragm E is resisted by the upward thrust on the diaphragm G of pressure fluid introduced into the chamber T formed beneath the diaphragm G by the clamping member $D^9$, which is cup shaped.

In the apparatus shown in Fig. 1, the means employed for maintaining the proper fluid pressure in the balancing chamber T comprises a pipe M supplying a suitable pressure fluid as compressed air or water under pressure. This pipe is connected to a pipe $M'$ by the restricted orifice $m$ formed in the disk $M^3$ clamped between the adjacent ends of pipes M and $M'$ by the coupling nut $M^2$. The pipe $M'$ is connected to the chamber T by branch pipe $M^4$ and is also connected to the waste valve casing $D^{10}$ which is located above and in line with the diaphragm stem H. The valve casing D¹⁰ is carried by a pair of arms D¹¹ connected at their lower ends to the casing part D'. A valve seat member D¹² is secured in the lower end of the casing D¹⁰ and is formed with a port D¹³ adapted to be closed by the ball valve J. This valve is lifted from its seat on an upward movement of the diaphragm by an extension H' of the bolt H adapted to enter without closing the port D¹³, and lift the valve J out of the position in which it closes the port D¹³. As shown the stem H' may be axially adjusted with respect to the bolt H by means of the threaded adjusting sleeve H².

In operation a fluid pressure will be maintained in the balancing chamber T just sufficient to balance the force tending to move the diaphragms E, F and G downward, for the slow but constant influx of pressure fluid into the piping M' and the chamber T through the restricted port $m$ tends to make the pressure in the chamber T exceed the balancing pressure required, while any excess of pressure in the chamber T is prevented by the lifting of the valve J off its seat, which occurs on any slight upward movement of the diaphragms. The resultant force tending to move the diaphragms downward comprises a variable component and a constant component. The variable component is proportional to the vertical distance $h$ between the weir notch apex level of the weir and the surface level of the water on the supply side of the weir. The constant component comprises ($a$), an element corresponding to the action on the upper side of the diaphragm E of the head of water between the weir notch apex level and the top of the member L', ($b$), the difference between the upward fluid pressure acting on the diaphragm F and the downward fluid pressure acting on the diaphragm G; and ($c$), the weight of the diaphragms and attached parts moving with them. The pressure of the atmosphere on the upper side of the diaphragm F also tends to move the diaphragms downward. This is exactly balanced however, by what I term the unmeasured component of the fluid pressure in the chamber T when that pressure is measured, as will ordinarily be the case, by a gage indicating, not absolute pressure, but absolute pressure minus atmospheric pressure. Since the diaphragms F and G are of equal area, the pressure in the chamber T is independent of the varying pressure in the vapor space of the weir chamber.

The pressure P in the balancing chamber T may thus be expressed by the equation $$P = a + bh,$$

where $a$ and $b$ are readily determined constants and $h$ is the distance defined above. The rate of flow over the weir is a function of the quantity $h$ which is well known for many different types of weirs and in any case may be determined by calculation or experiment. For instance, in the case of a weir formed with one or more V notches the rate of flow will be substantially proportional to $h5/2$. From the foregoing it is apparent that a suitably graduated pressure gage M⁹ showing the gage pressure in the chamber T will indicate the rate of flow over the weir, and an important advantage of my invention consists in the fact that the pressure per unit of area in the chamber T may be made many times greater than the differential per unit of area of the fluid pressures acting on the diaphragm E. This permits the use of commercial types of pressure measuring instruments and insures substantial and positive differences in the readings obtained thereby as the differential pressure varies by small increments. There is a distinct advantage in so arranging the apparatus so that in the form shown, a substantial balancing pressure is maintained in the chamber T when little or no water is flowing over the weir since this initial pressure minimizes errors and makes the operation of the apparatus positive when the rate of flow over the weir is small.

In general, the flow over the weir is not a linear function of the quantity $h$ and suitable rectifying provisions must be made to properly integrate and register the flow of the weir, and are advantageously employed where a graphic record of the flow is made. A simple and desirable form of coöperating rectifying and recording provisions is shown in Fig. 1. These provisions comprise a U tube N having one leg connected at its top to the variable pressure pipe M' by pipe N⁴ and having its lower portion N' variable in cross section as hereinafter explained. The other leg is open to the atmosphere at its top and, as shown, comprises portions N² and N³ each of constant cross section. The cross section of the lower portion N² is advantageously made appreciably smaller than the cross section of the upper portion N³ to reduce the volume of liquid required in the U tube. A float O resting on the surface of the liquid P in the U tube has attached to it a pencil O' engaging the record surface carried by the drum Q constantly rotated as by the clock motor Q'. The liquid P in the U tube may advantageously be mercury on account of its high specific gravity and its unchangeability under the conditions of use. The shape of the section N' of the U tube is such that the mercury displaced from it and forced into the section N³ will be directly proportional to the rate of flow over the weir, so that the latter will be indicated by the proportional scale affixed to the U tube portion $N^3$ and of which $N^5$ represents the zero line. The manner in which the section $N^3$ must be shaped to produce this result is determined by the following considerations.

The vertical distance X between the surface levels of the mercury in the two legs of the U tube will be proportional to the balancing pressure P and may be expressed by the equation $$X = dP.$$

The distance X will in general comprise three components, namely; X, equal to the variable distance of the mercury level in section $N^3$ above the zero line $N^5$; $c$, equal to the constant vertical distance between the zero line $N^5$ and the top of the variable cross section tube portion $N'$, and $X_2$, equal to the variable distance between the top of the section $N'$ and the mercury level therein. From the two equations given above, the equation $$X = d(a + bh)$$

may be derived from which it follows that $$X_1 + X_2 + C = da + b'h$$

where $b'$ is a constant.

In forming the U tube the distance C is made equal to $da$ so that $$X_1 + X_2 = b'h.$$

Since the sum of the components $X_1$ and $X_2$ is thus proportional to the quantity $h$, and the component $X_1$ is proportional to the rate of flow over the weir, and since the volume of the part of the U tube section $N'$ above the mercury level therein is proportional to $X_1$ it follows that the variable cross section given to the U tube section $N'$ depends upon the flow law of the weir and may be readily determined from the latter by methods well known to those skilled in the art.

While it is comparatively simple to closely approximate the desired cross sections of the different portions of the U tube, I consider it desirable in some cases, to make provisions for adjusting the volume of some portion of the U tube. For instance, as shown in Figs. 4 and 5, I may form a vertical groove in $N^6$ in the inner surface of the wall of the tube section $N^3$ and separate this groove from the mercury space of the section by a flexible membrane $N^7$. This membrane is adapted to be flexed by the adjusting blocks $N^8$ mounted in the groove $N^6$ and the coöperating screws $N^9$. A similar adjustment in the volume of different portions of the U tube may be obtained by the use of screws $N^{10}$ threaded through the wall of a portion of the U tube as shown in Fig. 6.

With this arrangement the adjustment is effected by causing more or less of the screws to extend into the tube. In some cases also, it is desirable to automatically adjust the net cross section of some portion of the U tube in response to variations in conditions which affect the law of flow over the weir or through the conduit to which the U tube pertains. For instance, in the apparatus shown in Figs. 1 and 2 the amount of water flowing over the weir for a given balancing pressure P increases as the temperature of water rises. To compensate for this, I may locate a flexible tube $N^{11}$ within the U tube section $N^3$ and connect this flexible tube to the vapor space of the weir chamber. With this arrangement a change in the temperature of the water passing through the weir chamber will mean, in general, a change in the pressure in the vapor space of the weir chamber and this, transmitted to the oval tube $N^{11}$, will expand the latter and thereby decrease the net cross sectional area of the U tube section $N^3$. This will result in increasing the rate of flow indicated by the apparatus for a given value of the balancing pressure P. Practically however, with the apparatus shown in Fig. 1, the errors due to ordinary temperature variations are so slight as to be negligible and indeed the smallness of these errors is an advantageous characteristic of my invention.

In the modified form of the differential pressure balancing mechanism shown in Fig. 7 the casing DA is divided into pressure chambers $R'$, $S'$ and $T'$, similar to chambers R, S and T of the construction first described by diaphragms E, F and G. In the construction shown in Fig. 7, however, the admission of pressure fluid to the balancing chamber $T'$ is controlled by the valve JA attached to the diaphragms and opening and closing a port $M^{11}$ formed in the end of a chambered member $M^{10}$ secured to the casing DA in line with the axes of the diaphragms. The pressure supply pipe M opens freely into the member $M^{10}$. In this form of apparatus however, the escape of the pressure fluid from the balancing chamber $T'$ can take place only through the restricted vent orifice $ma$ provided in the outlet pipe $D^{14}$. With the arrangement shown in Fig. 7 it will be apparent that when the resultant pressure acting downward on the diaphragms exceeds the upward thrust on the diaphragm G of the pressure in chamber $T'$, the valve JA will open the port $M^{11}$ and admit pressure fluid to the chamber $T'$ until the equilibrium is restored, whereupon the valve will again close the port. In this construction, as in that shown in Fig. 1, the diaphragm actuated controlling valve is normally "cracked" to an extent sufficient to permit as rapid a leakage through the port controlled by it as takes place through the permanently restricted orifice $ma$ or $m$ as the case may be.

In Fig. 7 a loading spring $D^{15}$ is provided to impress a constant pressure analogous to that imposed upon the diaphragms in the construction shown in Fig. 1 by the hydrostatic head due to the vertical distance between the top of the member $L'$ and the apex of the weir notch. As shown the tension of the spring $D^{15}$ is adjusted by means of a member $D^{16}$ in threaded engagement with an extension of the collar $D^{17}$ employed to secure the diaphragm $F$ in place.

The arrangement shown in Fig. 7, in which the outlet from the balancing chamber is restricted and the admission of the pressure fluid is controlled by the diaphragm actuated valve, is the equivalent in a broad way of the arrangement first described, in which the restricted port is in the pressure supply connection. I consider the arrangement of Fig. 1 preferable however, to that shown in Fig. 7, since, with the first described arrangement, the sensitiveness of the differential pressure balancing apparatus is less affected by pressure fluctuations in the pressure supply pipe and by unduly large movements of the diaphragm actuated valve.

The differential pressure balancing mechanism hereinbefore described is obviously not limited to use in the relation illustrated by Fig. 1, but is capable of use for many different purposes.

One example of a modified use of this apparatus is illustrated in Fig. 8 wherein $U$ represents a conduit for water, steam, compressed air or other fluid provided with a Venturi tube section $U'$. In such a conduit, as is well known, the rate of flow of the fluid passing through the conduit will be a function of the difference in the pressure at a full diameter portion of the conduit and the pressure at a restricted portion $U^2$ of the Venturi tube section. To determine the flow through the conduit with the differential pressure balancing mechanism of Fig. 1, I may connect the pipe $K$ of such a differential pressure balancing mechanism as is shown in Fig. 1 to a full diameter portion of the conduit $U$ and connect the pipe $L$ to the restricted portion $U^2$ of the Venturi tube section. The pressure maintained in the balancing chamber will then be a function of the rate of flow through the conduit.

In the modification shown in Fig. 9 the differential pressure balancing mechanism for determining the flow over a weir located in a closed weir chamber is located within the weir chamber $AA$ on the outlet side of the weir $BA$ and comprises a hollow casing $Z$ closed at its lower end by a diaphragm $EA$ directly exposed on its under side to the pressure in the vapor space of the weir chamber. The diaphragm $EA$ forms the lower wall of a pressure chamber $R^7$, a portion of the upper wall of which is formed by the smaller diaphragm $FA$, which is exposed on its upper side to the pressure of the atmosphere through the hollow casing part $Z'$ by which the casing member $Z$ is secured to the wall of the weir chamber $AA$. The chamber $R^7$ is connected to the supply side of the weir below the liquid surface level by the pipe $KA$. The balancing pressure chamber $T^2$ comprises a cup shaped member $Z^2$ and a diaphragm $GA$ directly connected to the diaphragms $EA$ and $FA$. The member $Z^2$ is connected as shown, to the casing $Z$ by arms $Z^3$. Arranged within the casing member $Z'$ is a valve casing $Z^{10}$ similar to the valve casing $D^{10}$ of Fig. 1 and containing a similar ball valve operated by the stem $Z^4$ connected to the diaphragms. The valve casing $Z^{10}$ may be connected to the balancing pressure chamber $T^2$, and to the pressure supply pipe $M$, and to suitable indicating apparatus as are the valve casing $D^{10}$ and balancing chamber $T$ of Fig. 1.

Under some conditions it may be desirable to employ a balancing pressure which is less than that of the atmosphere. This may be desirable, for instance, where there is no air compressor or other source of fluid under pressure immediately available, or which it is desirable to employ, and it is convenient to connect the balancing chamber to a vacuum pump, inspirator, or other low pressure apparatus. One example of such an arrangement is shown in Fig. 10 where $DB$ represents a pressure balancing mechanism which may be identical in construction with the device $A$ shown in Fig. 1 except that the chambered member $D^9$ in Fig. 1 is replaced by the clamping ring $D^7$, and the latter in turn is replaced by a chambered member $D^{90}$ formed with an aperture at its upper end receiving the ported valve seat member $D^{12}$. The port $D^{13}$ through the valve seat member $D^{12}$, which is open to the atmosphere at its upper end, is controlled by a ball valve $J$ as in Fig. 1. $MA$ represents a pipe leading from the balancing chamber $T^{10}$ to the inspirator $W$, which as shown, receives fluid under pressure through the pipe $W'$ and is open to the atmosphere through the expanding nozzle $W^2$. The pipe $MA$ includes a restricted port $MD$ and is connected between said port and the balancing chamber to a U tube $NA$ by a pipe $N^{21}$. The U tube $NA$ differs from the U tube $N$ of Fig. 1 in that the zero line $N^{22}$ of the chamber $N^3$ is located adjacent the upper end of the latter, and the specially shaped chamber $N^{20}$, replacing chamber $N'$ of Fig. 1, is located above the zero line $N^{22}$ and is upwardly expanded. The specially shaped portion of chamber $N^{20}$ may be, aside from its change in position identical in shape with the specially shaped portion of the chamber N' of Fig. 1. In the apparatus shown in Fig. 10 the lower of the two pressures to be differentiated is admitted to the chamber S and the high pressure is admitted to the chamber R.

The operation of the apparatus shown in Fig. 10 is analogous to that of the apparatus shown in Fig. 1. The pressure of the chamber $T^{10}$ will tend to decrease toward the vacuum maintained on the outlet side of the port in $a$ when the valve J is seated and when the valve J is unseated, atmospheric air will enter the chamber $T^{10}$, causing the pressure to rise therein. The pressure in the chamber $T^{10}$ will thus be proportional to the differential of the pressures in chambers R and S.

A simple modification of the differential pressure balancing apparatus heretofore described is shown in Fig. 11, wherein three separate cup shaped casing members, each having its end closed by a diaphragm, are placed in line and have their parallel diaphragms connected by the axial stem Y. As shown, the end casings RA and SA, receiving respectively the higher and lower pressures to be differentiated, have their diaphragms $r$ and $s$ of equal size and facing one another. The casing TA receiving the balancing pressure has its diaphragm $t$ facing the diaphragm $s$, and is formed with a central valve seated port $t'$ controlled by the valve member Y' adjustably secured to the stem Y which passes loosely through the port $t'$. As shown, a vacuum pipe MA, having a restricted port $ma$, is connected to the interior of the casing TA. The operation of the apparatus shown in Fig. 11 is similar to that of the apparatus shown in Fig. 10. It will be understood, of course, that by arranging the valve member Y' within the chamber TA, the apparatus can be arranged to operate with a balancing pressure above that of the atmosphere in which case the higher pressure should be admitted to casing SA and the lower to casing RA.

The modification illustrated in Fig. 12 differs from the apparatus shown in Fig. 1 in that the pipe KK replacing the pipe K and K' of Fig. 1 opens into the chamber S of the casing member D, while the receptacle L' is located at an appreciably higher level than the inlet end of the pipe KK, and the pipe LL leading from the receptacle D, and differs further in that the specially shaped portion N' of the U tube is inverted. With this form of apparatus as in that shown in Fig. 1, a substantial balancing pressure will be required in the chamber T at all times. With the arrangement shown in Fig. 12, unlike that shown in Fig. 1, however, the balancing pressure required will decrease as the rate of flow over the weir increases. In other words, the general law for the pressure in the balancing chamber may be expressed by the equation $$P = a + b'h,$$

where $b'$ is a constant negative quantity which can be determined just as the quantity $b$ in the equation $$P = a + b'h$$

is determined as hereinbefore explained. With the arrangement shown in Fig. 12, the level of the mercury, or other fluid P in the chamber $N^3$ will fall and not rise as the rate of flow over the weir increases.

In the different forms of the differential pressure balancing mechanism described, it will be observed that the flexible wall portions of the various chambers are caused to move simultaneously by mechanical connections which do not pass slidingly through the walls of any of the pressure chambers. These connections, therefore, do not require stuffing box or the like leakage preventing provisions which, if used, give rise to friction interfering with the free functioning of the apparatus. It will be apparent moreover that with all of the forms of the differential pressure balancing mechanism disclosed, it is possible, by varying the relative sizes of the diaphragms to obtain a balancing pressure which may be larger or smaller per unit of area as desired, than the differential of the pressures differentiated. Furthermore, the functioning of the apparatus is in nowise affected by changes in the absolute pressures to be differentiated, but is solely responsive to the difference between these absolute pressures.

While in accordance with the statutes I have illustrated and described the best forms of apparatus now known to me, it will be apparent to those skilled in the art that changes may be made in the form of apparatus disclosed without departing from the spirit of my invention and that certain features of my invention are useful for many purposes other than in connection with flow measuring apparatus.

Having now described my invention what I claim as new and desire to secure by Letters Patent is:

1. In a differential pressure balancing device the combination of an inclosure forming two differential pressure chambers separated by a common flexible wall and a balancing chamber separated from one of said pressure chambers by a flexible wall, the other of said pressure chambers having a flexible wall externally exposed to the atmosphere, means mechanically connecting all of said flexible walls together for simultaneous movement, and means responsive to the movements of said flexible walls for maintaining a pressure within said balancing chamber tending to hold said flexible walls in a neutral position.

2. A differential pressure balancing mechanism comprising in combination an inclosure forming two differential pressure chambers, each having a flexible wall portion and a balancing chamber having a flexible wall portion and a vent connection, means mechanically connecting all of said flexible wall portions together for simultaneous movements, and means responsive to the movements of said flexible wall portions for regulating the pressure in said balancing chamber, comprising a pressure supply conduit connected to said balancing chamber by a restricted port, and a valve connected to said diaphragm and controlling said vent connection.

3. A differential pressure balancing device comprising a casing formed with an aperture in its wall, a flexible diaphragm closing said aperture, two diaphragms parallel to the first mentioned diaphragm and dividing the interior of said casing into three pressure chambers of which the one remote from said aperture contains pressure fluid for balancing the differential action on said central diaphragm of the pressures in the other two chambers, means connecting said diaphragms for simultaneous movement, and means controlled by the movements of said diaphragms for regulating the pressure in said balancing chamber.

4. A differential pressure balancing device comprising a casing formed with apertures in its opposite walls, a flexible diaphragm closing each aperture, a third flexible diaphragm parallel to the first mentioned diaphragms and dividing the interior of said casing into two pressure chambers, means connecting said diaphragms for simultaneous movement and means for balancing the differential action on said diaphragm of the pressures in said two chambers.

5. In a differential pressure balancing device, the combination of an inclosure forming a pressure chamber, two parallel flexible walls acted on internally of the chamber by one of the pressures to be differentiated and externally exposed, one to the pressure of the atmosphere and the other to the second of the two pressures to be differentiated, an inclosure forming a balancing chamber having a flexible wall exposed externally to said second pressure means mechanically connecting all said flexible walls, and means controlled by the movements of said flexible walls for maintaining a balancing pressure in said balancing chamber.

6. In a differential pressure balancing device the combination of an inclosure forming a pressure chamber, two parallel flexible walls acted on internally of said chamber by one of the pressures to be differentiated and externally exposed, one to the pressure of the atmosphere and the other to the second of the two pressures to be differentiated, an inclosure forming a balancing chamber having a flexible wall exposed externally to said second pressure means mechanically connecting all said flexible walls, and means controlled by the movements of said flexible walls for maintaining a balancing pressure in said balancing chamber, the flexible wall of the first mentioned pressure chamber exposed externally to the atmosphere and the flexible wall of the said balancing chamber being equal in area and smaller than the other flexible wall mentioned.

7. A differential pressure balancing device comprising a casing formed with an aperture in its wall, a flexible diaphragm closing said aperture, two diaphragms parallel to the first mentioned diaphragm and dividing the interior of said casing into three pressure chambers of which the one remote from the first mentioned diaphragm receives pressure fluid for balancing the differential action on the central diaphragm of the fluid pressures in the other two chambers, means connecting said diaphragms for simultaneous movement, and means controlled by the said diaphragm for regulating the pressure in said balancing chamber and comprising a valve actuated by the movements of said diaphragms, a port admitting pressure fluid to said balancing chamber an a vent port through which pressure fluid may escape from said balancing chamber, one of said ports being restricted and the other being controlled by said valve.

8. A differential pressure balancing device comprising a casing formed with an aperture in its wall, a flexible diaphragm closing said aperture, two diaphragms parallel to the first mentioned diaphragm and dividing said casing into three pressure chambers of which the one remote from the first mentioned diaphragm receives pressure fluid for balancing the differential action on the central diaphragm of the fluid pressure in the other chambers, the outer diaphragms being of equal area and smaller than said central diaphragm, means for connecting said diaphragms for simultaneous movement, and means connected to said diaphragms for regulating the pressure in said balancing chamber and comprising a valve actuated by movements of said diaphragms, a conduit forming a port admitting pressure fluid to said balancing chamber, and a conduit forming a vent port through which pressure fluid may escape from said balancing chamber, one of said ports being restricted and the other being controlled by said valve.

9. A differential pressure balancing device comprising a casing formed with an aperture in its wall, a flexible diaphragm closing said aperture, two diaphragms parallel to the first mentioned diaphragm and dividing said casing into three pressure chambers of which the one remote from the first mentioned diaphragm receives pressure fluid for balancing the differential action on the central diaphragm of the fluid pressures in the other chambers, the outer diaphragms being of equal area and smaller than said central diaphragm, means for connecting said diaphragm for simultaneous movement, and means connected to said diaphragm for regulating the pressures in said balancing chamber and comprising a valve casing formed with a port, a ball valve tending to seat on and close said port and a member connected to said diaphragms and adapted to engage said valve and move it off its seat on a predetermined movement of the diaphragms.

10. The combination with a closed weir chamber, of apparatus for measuring the differential between the pressure in the vapor space of the weir chamber and the hydrostatic pressure in the weir chamber on the supply side of the weir at the lowest level at which flow over the weir occurs, said apparatus including a movable member, means for subjecting said member to a variable force which is a function of said pressure differential, and means for subjecting said member to a constant loading force.

11. The combination with a closed weir chamber and a weir therein, of means for measuring the flow of a liquid over the weir, comprising an inclosure forming two pressure chambers, a pipe connection between one of said chambers and the weir chamber opening to the latter on the supply side of the weir below the lowest level at which flow over the weir occurs, a pipe connection between the second pressure chamber and the vapor space of the weir chamber, and a movable member acted upon in opposite directions by the liquid pressures in the two pressure chambers, said weir chamber, pipe connection and pressure chambers being so relatively arranged that each pipe connection and pressure chamber will be normally filled with the liquid flowing over the weir, and when the liquid level on the supply side of the weir is at said lowest level, a resultant liquid pressure will be exerted on said movable member which will increase without changing in direction when the height of liquid level on the supply side of the weir rises above said lowest level.

12. The combination with a closed weir chamber, of means for measuring the flow of a liquid over the weir comprising a differential pressure measuring device including an inclosure forming two pressure chambers separated by a flexible diaphragm, a conduit connecting one of said chambers to the weir chamber on the supply side of the weir below the lowest level of flow over the weir, and a second conduit leading from the other chamber to the vapor space of the weir chamber and opening upward therein in the latter at a level below that at which the first mentioned conduit opens to the weir chamber.

13. The combination with a closed weir chamber, of means for measuring the flow of a liquid over the weir comprising a differential pressure measuring device including an inclosure forming two pressure chambers separated by a flexible diaphragm, a conduit connecting one of said chambers to the weir chamber on the supply side of the weir below the lowest level of flow over the weir, a second conduit leading from the other chamber to the vapor space of the weir chamber and opening upward therein at a level below that at which the first mentioned conduit opens to the weir chamber and means for constantly supplying liquid to said second conduit.

14. In a differential pressure balancing mechanism, the combination of inclosures forming three pressure chambers, one adapted to receive one and another the second of the two pressures to be differentiated and the third to receive a balancing pressure, three parallel coaxial diaphragms, one exposed to the pressure in one of said chambers, a second exposed to the pressure in another of said chambers and the third exposed to the pressure in the third of said chambers, an axially extending connection between said diaphragms, and means for regulating the pressure in said balancing chamber and including a valve mechanism controlled by the movements of said diaphragms.

15. In apparatus for measuring a quantity which is a non-linear function of the differences between two pressures, the combination of a differential pressure balancing mechanism comprising a balancing chamber formed with a flexible wall, means subjecting said wall to an inwardly acting force consisting of a constant loading component and a component proportional to the differential of said pressures, means controlled by the movement of said flexible wall for maintaining a balancing pressure within said chamber, and a U tube having the end of one leg connected to said balancing chamber and adapted to contain a fluid body forming a liquid seal between the ends of said tube, the latter having the internal cross section of its legs so proportioned relatively to each other and to said function that the vertical distance in one leg of said tube between the corresponding end of said sealing body and a predetermined zero level will be directly proportional to said quantity.

16. Pressure measuring apparatus comprising in combination a U tube adapted to contain a liquid sealing said tube and adapted to have one end connected to a source of pressure which is equal to a constant plus a nonlinear function of a quantity to be determined, and having the other end open to the atmosphere said tube having the internal cross section of its legs so proportioned relative to each other and to said function that the vertical distance between the liquid level in one of said legs and a predetermined zero level will be directly proportional to said quantity.

17. A differential pressure indicating device comprising in combination a U tube internally exposed at its opposite ends to the pressures to be differentiated and adapted to contain a fluid forming a movable seal between the ends of the tube, manually adjustable means for varying the volume of a portion of said tube and a flattened flexible tube inserted in a portion of said U tube and adapted to receive a fluid pressure changing the shape of said flattened tube whereby the volume of the portion of the U tube receiving said flattened tube is varied when the internal pressure in the latter is varied.

18. A differential pressure indicating device comprising in combination a member formed with a channel adapted to be exposed at its opposite ends to the pressures to be differentiated and adapted to contain a fluid forming a movable seal between the ends of said channel and means for adjusting the cross sectional area of the portion of said channel through which one end of said seal moves as the differential of said pressures increases and diminishes.

19. A differential pressure indicating apparatus comprising in combination a member formed with a channel adapted to be exposed at its opposite ends to the pressures to be differentiated and adapted to contain a fluid forming a movable seal between the ends of said channel and means for adjusting the cross sectional area of the portion of said channel through which one end of said seal moves as the differential of said pressures increases and diminishes, said means comprising an adjustable displacement body extending into said channel.

20. A differential pressure indicating device comprising in combination a member formed with a channel adapted to be exposed at its opposite ends to the pressures to be differentiated and adapted to contain a fluid forming a movable seal between the ends of said channel and means for adjusting the cross sectional area of a portion of said channel, said means comprising a flattened flexible tube extending into said channel and subjected to an internal pressure whereby the volume of said tube may be changed by varying said internal pressure.

21. A differential pressure indicating device comprising in combination a member formed with a channel having a flexible wall portion and adapted to be exposed at its opposite ends to the pressures to be differentiated and adapted to contain a fluid forming a movable seal between the ends of said channel, and means for adjusting said flexible wall portion at various points along the length of said channel to adjust the cross sectional area of corresponding portions of said channel.

22. A differential pressure indicating device comprising in combination a member formed with a channel adapted to be exposed at its opposite ends to the pressures to be differentiated and adapted to contain a fluid forming a movable seal between the ends of said channel, means for manually adjusting the volume of a portion of said channel, and means for adjusting the volume of a portion of said channel in response to changes in a variable pressure comprising a flexible wall exposed on one side to said channel along a portion of the length of the latter and exposed on the other side to said variable pressure.

23. A differential pressure indicating device comprising a member formed with a channel adapted to be exposed at its opposite ends to pressures to be differentiated and adapted to contain a fluid forming a movable seal between ends of said channel, means for adjusting the volume of a portion of said channel in response to changes in a variable pressure comprising a flexible wall exposed on one side of said channel along a portion of the length of the latter and exposed on the other side to said variable pressure.

24. The combination with a closed weir chamber, of means for measuring the flow of a liquid over the weir comprising a differential pressure measuring device including an inclosure forming two pressure chambers separated by a flexible diaphragm, a conduit connecting one of said chambers to the weir chamber on the supply side of the weir below the lowest level of flow over the weir, and a second conduit leading from the other chamber to the vapor space of the weir chamber and opening upward therein in the latter at a level different from that at which the first mentioned conduit opens to the weir chamber.

25. The combination with a closed weir chamber, of means for measuring the flow of a liquid over the weir comprising a differential pressure measuring device including an inclosure forming two pressure chambers separated by a flexible diaphragm, a conduit connecting one of said chambers to the weir chamber on the supply side of the weir below the lowest level of flow over the weir, a second conduit leading from the other chamber to the vapor space of the weir chamber and opening upward therein at a level different from that at which the first mentioned conduit opens to the weir chamber and means for constantly supplying liquid to said second conduit.

GEORGE HERBERT GIBSON.

Witnesses:
J. RALPH GIBSON,
EUGENE L. LARKIN.